(12) United States Patent
Mori (10) Patent No.: US 6,520,782 B2
(45) Date of Patent: Feb. 18, 2003

(54) CONNECTOR WITH SHUTTER MECHANISM

(75) Inventor: Shigeo Mori, Haibara-gun (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/052,628

(22) Filed: Jan. 23, 2002

(65) Prior Publication Data

US 2002/0115319 A1 Aug. 22, 2002

(30) Foreign Application Priority Data

Jan. 23, 2001 (JP) .................................... 2001-014795

(51) Int. Cl.[7] ............................................... H01R 13/44
(52) U.S. Cl. ....................................... 439/138; 439/310
(58) Field of Search .............................. 439/133, 134, 439/135, 136, 137, 138, 139, 140, 310, 353

(56) References Cited

U.S. PATENT DOCUMENTS

| | | | | | |
|---|---|---|---|---|---|
| 4,176,897 A | * | 12/1979 | Cameron | ..................... | 439/138 |
| 5,344,331 A | * | 9/1994 | Hoffman et al. | ............ | 439/138 |
| 5,716,224 A | * | 2/1998 | Masuda et al. | ............. | 439/138 |
| 6,250,945 B1 | * | 6/2001 | Murakami et al. | .......... | 439/353 |
| 6,332,781 B1 | * | 12/2001 | Ito | .............................. | 439/138 |

FOREIGN PATENT DOCUMENTS

| | | |
|---|---|---|
| JP | 6-333642 | 2/1994 |
| JP | 6-333643 | 2/1994 |
| JP | 6-203919 | 7/1994 |
| JP | 8-138785 | 5/1996 |

* cited by examiner

*Primary Examiner*—P. Austin Bradley
*Assistant Examiner*—Briggitte R. Hammond
(74) *Attorney, Agent, or Firm*—Sughrue Mion, PLLC (57) ABSTRACT

A receiving-side subconnector of a connector with a shutter mechanism according to the invention has a cap urged in an opening direction, and a cap lock provided at a side opposite thereto. The receiving-side subconnector further has a receiving-side shutter, which is supported on a first shutter shaft and urged by a shutter spring in the opening direction, and a first shutter lock urged in the direction of a first shutter shaft. Furthermore, a feeding-side subconnector has a feeding-side shutter that is supported on a second shutter shaft and urged by a shutter spring in an opening direction. Moreover, the feeding-side subconnector further has a second shutter lock urged in the direction of the second shutter shaft.

18 Claims, 13 Drawing Sheets

CONNECTOR WITH SHUTTER MECHANISM

BACKGROUND OF THE INVENTION

1. Field of the Invention

The present invention relates to a structure of a connector with a shutter mechanism, which is constituted by a pair of female and male subconnectors and aims at electrical connection of an electrically driven apparatus, such as an electric car, which needs to perform charging operations.

2. Related Art

Hitherto, an internal battery (that is, a chargeable battery) mounted in an electric car is charged by a feeder apparatus installed in a feeder station. That is, a feeder subconnector is connected to an end of a feeder cord drawn out of the feeder apparatus. Power is fed to the internal battery, which is electrically connected to a car-side receiving subconnector, by connecting this feeder subconnector to a vehicle-side receiving subconnector.

Figure 12:
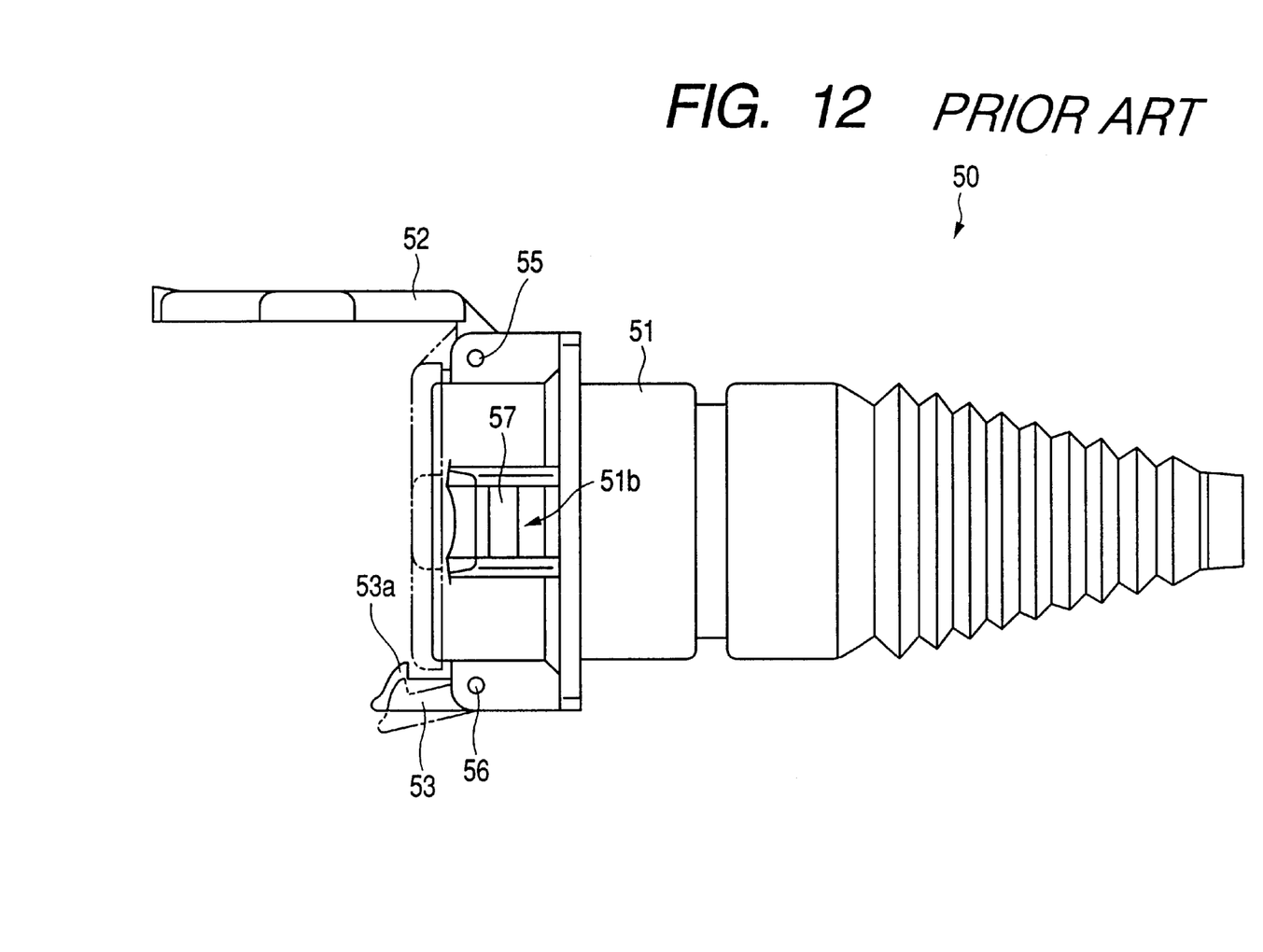
FIG. 12 is a side view illustrating an example of a conventional receiving-side subconnector.
Figure 13:
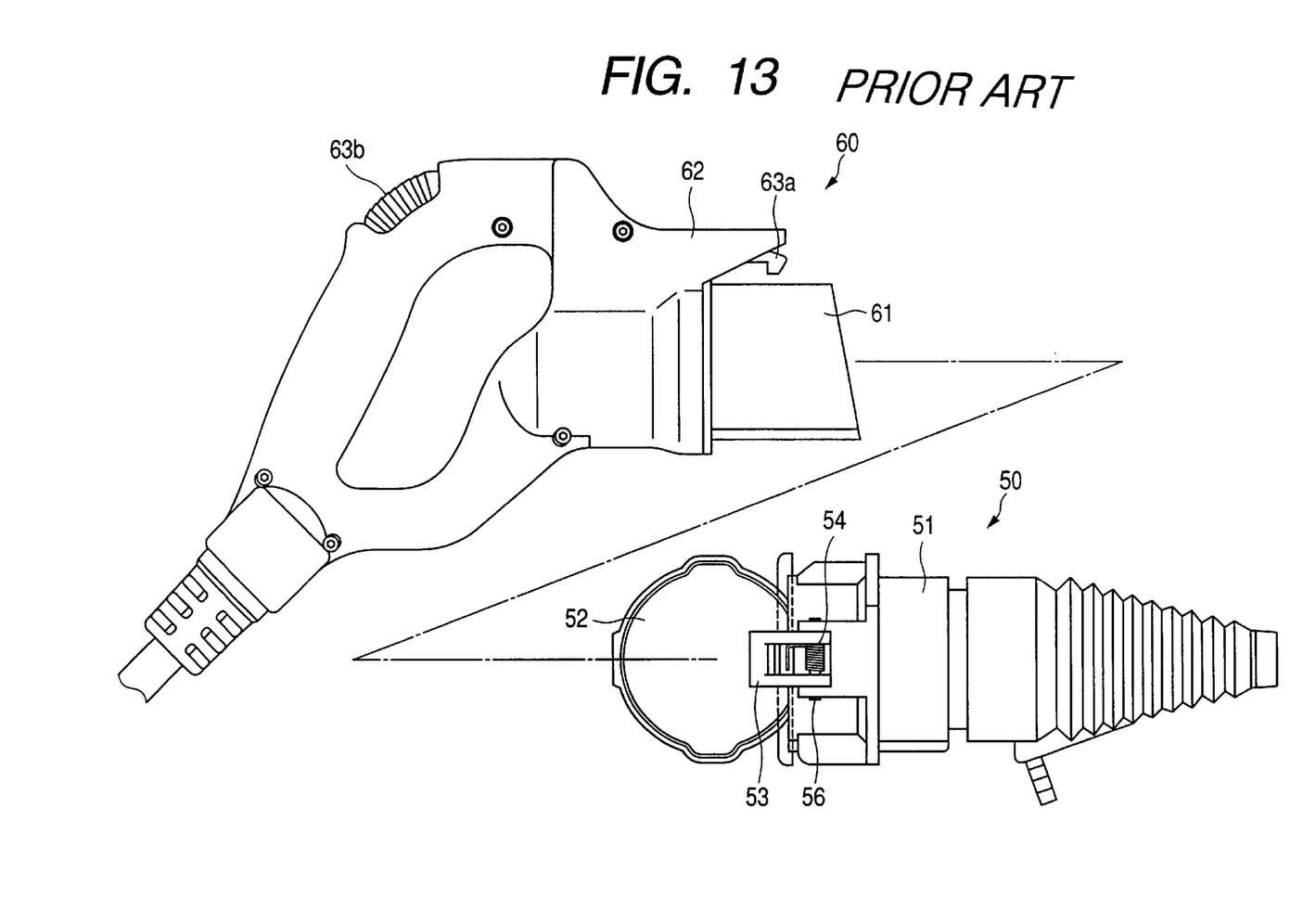
FIG. 13 is a side view illustrating an example of a feeding-side subconnector to be fitted to the receiving-side subconnector of FIG. 12.

In a conventional receiving subconnector 50 illustrated in FIGS. 12 and 13, a cap 52 is supported by a cap pin 55 so that neither water nor dust directly enters a housing 51 into which a connecting terminal (not shown) is built.

Further, a cap lock 53 for holding the cap 52 in such a manner as to be in a closed state is supported at a side opposite to the cap 52 by a lock pin 56. This cap 52 is always urged by a cap spring (not shown) in an opening direction. The cap lock 53 is always urged by a lock spring 54 toward the inside of the housing.

Moreover, in the conventional feeder subconnector 60 illustrated in FIGS. 12 and 13, a housing 61, into which a connecting terminal (not shown) is incorporated, and a lock arm 63, which is supported on the arm shaft 64 and used for fitting the receiving subconnector 50 into the housing and for holding the receiving subconnector 50 are built into an outer case 62. Furthermore, an end portion 63a of the lock arm 63 is always urged by a lock arm spring 65.

Figure 14:
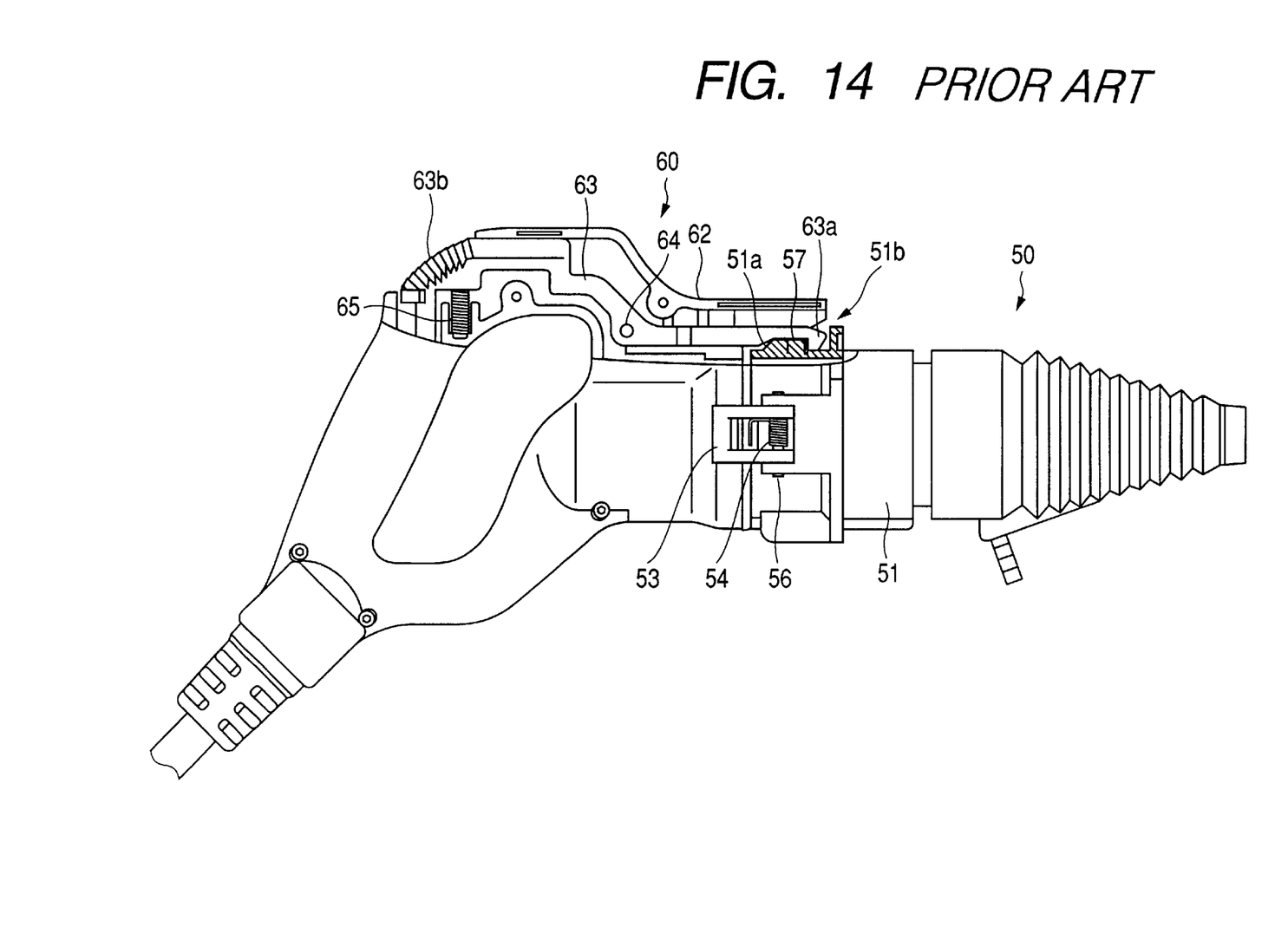
FIG. 14 is a side view illustrating a state in which the receiving-side subconnector and the feeding-side subconnector shown in FIG. 13 are fitted into each other.

When the feeder subconnector 60 is inserted into the receiving subconnector 50, the cap lock 53 is unlocked. Then, the cap 52 is opened. Subsequently, the feeder subconnector 60 is inserted thereinto. Thus, the end portion 63a of the lock arm 63 is stranded on a tapered surface 51a of the housing 51.

Then, the end portion 63a of the lock arm 63 passes through the feeder subconnector 60 and is accommodated in a lock arm engaging groove 51b by further inserting the feeder subconnector 60 thereinto. Thus, operations of fitting the feeder subconnector 60 into the receiving subconnector 50 and connecting both the subconnectors 50 and 60 to each other are completed.

Further, when both the subconnectors 50 and 60 are disengaged from each other, by urging an operating portion 63b of the lock arm 63. Thus, the lock arm 63 is turned around the arm shaft 64, so that the end portion 63a upwardly moves. The subconnectors 50 and 60 can be disconnected from each other by then rearwardly pulling out the feeder subconnector 60.

In the aforementioned conventional receiving subconnector 50, although the cap 52 is locked by the cap lock 53 when the subconnector 50 is not fitted, there is a fear that a user's finger is brought into contact with the terminal and gets an electric shock when the cap 52 is opened by unlocking the cap lock 53 for fitting the cap 50.

Furthermore, the cap lock 53 for locking the cap 52 is separated from the lock arm engaging groove 51b. Thus, there have been caused problems that the number of components increases, and that the structure of the connector becomes complex, and that the size of the housing 51 itself increases.

SUMMARY OF THE INVENTION

The invention is accomplished to solve the problems of the conventional connector. Accordingly, an object of the invention is to provide a connector with a shutter mechanism, which can prevent a user by reliably locking the shutter from getting an electric shock, and can easily unlock the lock state as both the female and male subconnectors are fitted into each other, and can perform miniaturization of both the female and male subconnectors by reducing the number of components and simplifying the structure thereof.

(1) The aforementioned problems can be solved by a connector including a first subconnector having an openable and closable cap provided at a front end portion of the first subconnector and a second subconnector to be fitted to the first subconnector, each of the first and second subconnectors including a shutter mechanism comprising: a shutter closing a chamber when the first subconnector and the second subconnector are not fitted into each other, and the shutter being adapted to turn in an opening direction when the first subconnector and the second subconnector are fitted into each other; and a shutter lock turnably supported on a shaft in a vicinity of the shutter and urged by a spring; wherein the shutter lock prevents a turning of the shutter when the first subconnector and the second subconnector are not fitted into each other and the shutter lock turns against an urging force of the spring to thereby release lock of the shutter when the first subconnector and the second subconnector are fitted into each other.

(2) The aforementioned problems can be solved by the connector according to (1), further comprising a cap lock provided on a connector housing of the first subconnector for preventing a turning of the cap when the first subconnector is not fitted into the second subconnector, the cap lock serving as a fitting lock for locking the second subconnector when the first subconnector is fitted to the second subconnector.

(3) The aforementioned problems can be solved by the connector according to (2), wherein the cap lock is turnably supported on a shaft and urged by a spring in a direction of inside of the connector housing, and wherein a lock accommodating portion for engaging an end portion of the cap lock with a side portion of the second subconnector.

(4) The aforementioned problems can be solved by the connector according to (1), wherein a first shutter provided in the first subconnector is turnably supported on a first shutter shaft and urged by a spring in a closing direction, and wherein when the first and second subconnectors are fitted into each other, the first shutter is turned by a front end of the second subconnector in an opening direction.

(5) The aforementioned problems can be solved by the connector according to (4), wherein a first shutter lock provided in the first subconnector is turnably supported on a shaft and urged by a spring, and wherein the first shutter lock has a first lock-releasing projection, against which an end portion of the second subconnector abuts when the first and second subconnectors are fitted into each other.

(6) The aforementioned problems can be solved by the connector according to (4), wherein a second shutter provided in the second subconnector is turnably supported on a second shutter shaft and urged by a spring in a closing direction, and wherein a boss portion for turning the second shutter in an opening direction is provided at a side portion of the second shutter.

(7) The aforementioned problems can be solved by the connector according to (6), further comprising a shutter guide groove provided in the connector housing of the first subconnector for guiding a free end portion of the second shutter, which is in an open state, in the second subconnector; and a curved cam groove provided in range with the shutter guide groove for guiding the boss portion when the first and second subconnectors are fitted into each other.

(8) The aforementioned problems can be solved by the connector with a shutter mechanism according to (1), further comprising a rib provided in the connector housing of the first subconnector for turning a second shutter lock when the first and second subconnectors are fitted into each other; and a rib receiving groove for guiding the rib provided in a connector housing of the second subconnector; wherein the second shutter lock provided is turnably supported on a shaft and urged by a spring and has a second lock-releasing projection, against which an end portion of the rib abuts.

As another aspect of the present invention, it is obtained a subconnector adapted to be fitted to a mate subconnector comprising: a shutter closing a chamber when the subconnector is not fitted into the mate subconnector, and the shutter being adapted to turn in an opening direction when the subconnector is fitted into the mate subconnector; an openable and closable cap provided at a front end portion of the subconnector for closing the front end portion; and a shutter lock turnably supported on a shaft in a vicinity of the shutter and urged by a spring; wherein the shutter lock prevents a turning of the shutter when the subconnector is not fitted into the mate subconnector and the shutter lock turns against an urging force of the spring to thereby release lock of the shutter when the subconnector is fitted into the mate subconnector.

In the present invention, a shutter lock for preventing, when both the subconnectors are not fitted into each other, each of the shutters from turning is turnably supported on a shaft in the vicinity of the shutter and urged by a spring in a direction. Further, when both the subconnectors are fitted into each other, the shutter lock turns against an urging force of the spring to thereby release the lock of the shutter.

Thus, when both the subconnectors are not fitted into each other, each of the shutters is reliably locked by the shutter lock, which is urged by a spring in one direction. Consequently, it does not occur that the shutters are easily released. Conversely, at the time of performing the fitting of the subconnectors, the shutter lock turns against the urging force of a spring, as both the subconnectors are fitted into each other. Thus, the lock state of the shutter is released, so that the shutter is opened. Then, the connecting terminals of both the subconnectors are connected to each other by accommodating the opened shutter in the housing. Thus, when both the subconnectors are not fitted into each other, opening portions of the connecting terminals are completely closed by the shutters. Consequently, an operator can be reliably prevented from getting an electric shock. Thus, a highly reliable connector with a shutter mechanism can be obtained.

Further, in the invention, a cap lock for preventing, when both the subconnectors are not fitted into each other, the cap from turning is provided on a connector housing. Moreover, the cap lock is also used as a fitting lock for locking a fitting state, in which the first subconnector is fitted to the second subconnector, upon completion of fitting both the first and second subconnectors into each other. Furthermore, in the third connector of the invention, the cap lock is turnably supported on a shaft and urged by a spring in a direction of the inside of the connector housing, and that a lock accommodating portion for engaging an end portion of the cap lock with a side portion of the second subconnector.

Therefore, upon completion of fitting between both the subconnectors, the end portion of the cap lock engages with the lock accommodating portion of the counterpart second subconnector. Thus, the cap lock functions as a fitting lock for locking a state in which both the subconnectors are completely fitted into each other. Therefore, there is no necessity for providing the dedicated fitting lock at the side of the first subconnector. The structure can be simplified by reducing the number of components. The miniaturization of both the subconnectors can be achieved.

Further, in the invention, a first shutter at the side of the first subconnector is turnably supported on a first shutter shaft and urged by a spring in a closing direction. Moreover, when both the subconnectors are fitted into each other, the first shutter is turned by a front end of the second subconnector in an opening direction. Furthermore, in the fifth connector of the invention, a first shutter lock at the side of the first subconnector is turnably supported on a shaft and urged by a spring in a direction. Further, the first shutter lock has a first lock-releasing projection, against which an end portion of the second subconnector abuts when both the subconnectors are fitted into each other.

Therefore, when both the subconnectors are not fitted into each other, the first shutter is urged by a spring in a closing direction. Moreover, the first shutter is locked and urged by the first shutter lock, which is urged by the spring, in a closing direction, so that the first shutter is not opened by an external force.

Conversely, when both the subconnectors are fitted into each other, the end portion of the counterpart second subconnector abuts against the first projection. Thus, the first shutter lock turns and releases the lock state of the first shutter. Moreover, the end portion of the second subconnector causes the first shutter to turn in an opening direction. Therefore, as both the subconnectors are fitted into each other, the lock state of the first shutter can easily be released.

Further, in the invention, a second shutter at the side of the second subconnector is turnably supported on a second shutter shaft and urged by a spring in a closing direction. Moreover, a boss portion for turning the second shutter in an opening direction is provided at a side portion of the second shutter. Furthermore, in the seventh connector of the invention, a shutter guide groove for guiding a free end portion of the second shutter, which is in an open state, at the side of the second subconnector is provided in the connector housing of the first subconnector. Further, a curved cam groove for guiding, when both the subconnectors are fitted into each other, the boss portion is provided in range with the shutter guide groove.

Therefore, when the subconnectors are fitted into each other, the boss portion of the second shutter slides on the cam groove, so that the second shutter is opened in the fitting direction against the urging force of the spring, and that both side ends of the free end portion thereof are fitted and inserted into the shutter guide groove. Consequently, as both the subconnectors are fitted into each other, the second shutter can reliably be opened and accommodated in the connector housing of the counterpart first subconnector.

Furthermore, in the invention, a rib for turning, when both the subconnectors are fitted into each other, a second shutter lock is provided in the connector housing at the side of the first subconnector. Further, the second shutter lock at the side of the second subconnector is turnably supported on a shaft and urged by a spring in a direction and has a second lock-releasing projection, against which an end portion of the rib abuts. Moreover, a rib receiving groove for guiding the rib is provided in the connector housing at the side of the second subconnector.

Therefore, when both the subconnectors are not fitted into each other, the second shutter is urged by a spring in a closing direction. Moreover, the second shutter is locked and urged by the second shutter lock, which is urged by the spring, in a closing direction, so that the second shutter is not opened by an external force. Conversely, at the time of performing the fitting of the subconnectors, the end portion of the rib guided by the rib receiving groove abuts against the second projection of the second shutter lock, as the both the subconnectors are fitted into each other. Thus, the second shutter lock is turned, so that the lock state of the second shutter can be released. Consequently, as both the subconnectors are fitted into each other, the lock state of the second shutter can reliably be released.

DETAILED DESCRIPTION OF THE PREFERRED EMBODIMENT

Figure 1:
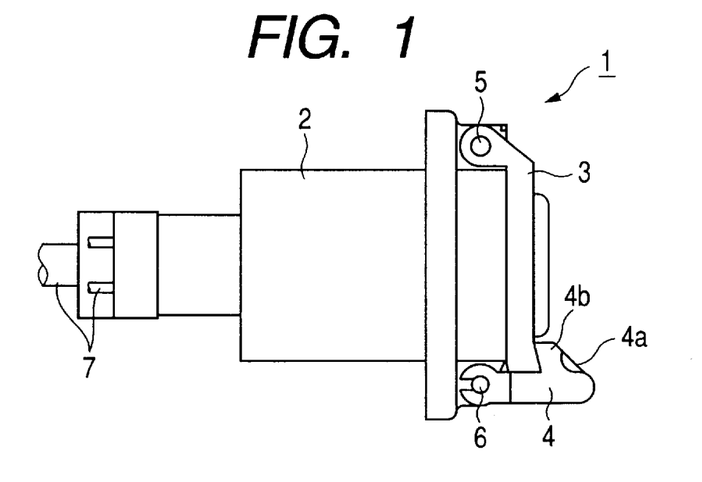
FIG. 1 is a plan view illustrating an embodiment of a receiving-side subconnector of a connector with a shutter mechanism according to the invention.
Figure 2:
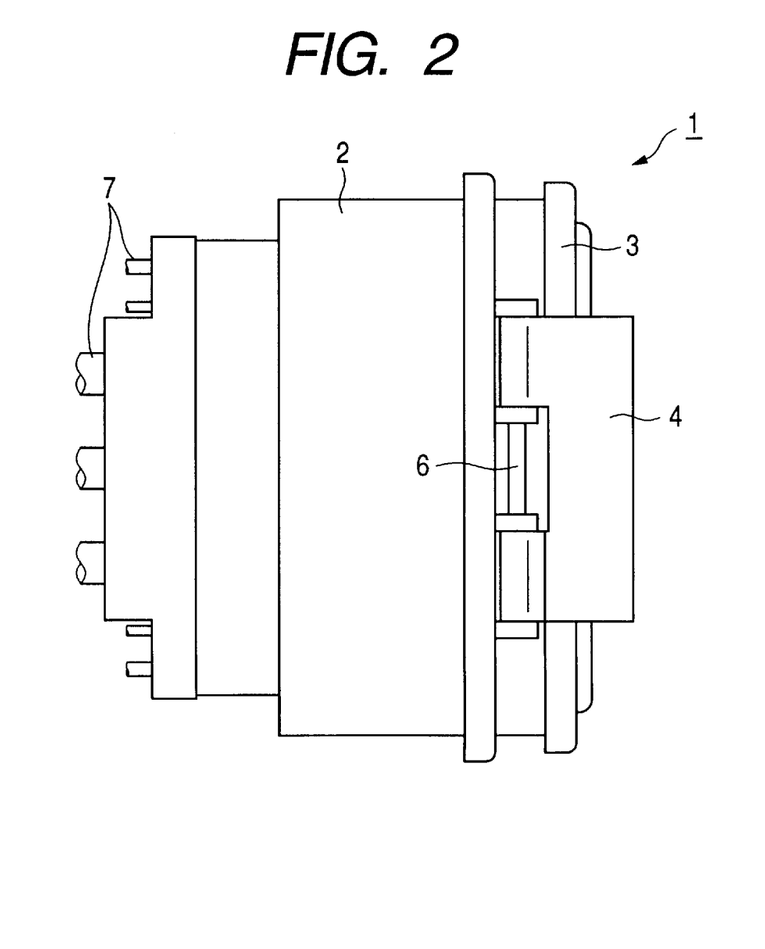
FIG. 2 is a side view illustrating the receiving-side subconnector of FIG. 1.
Figure 3:
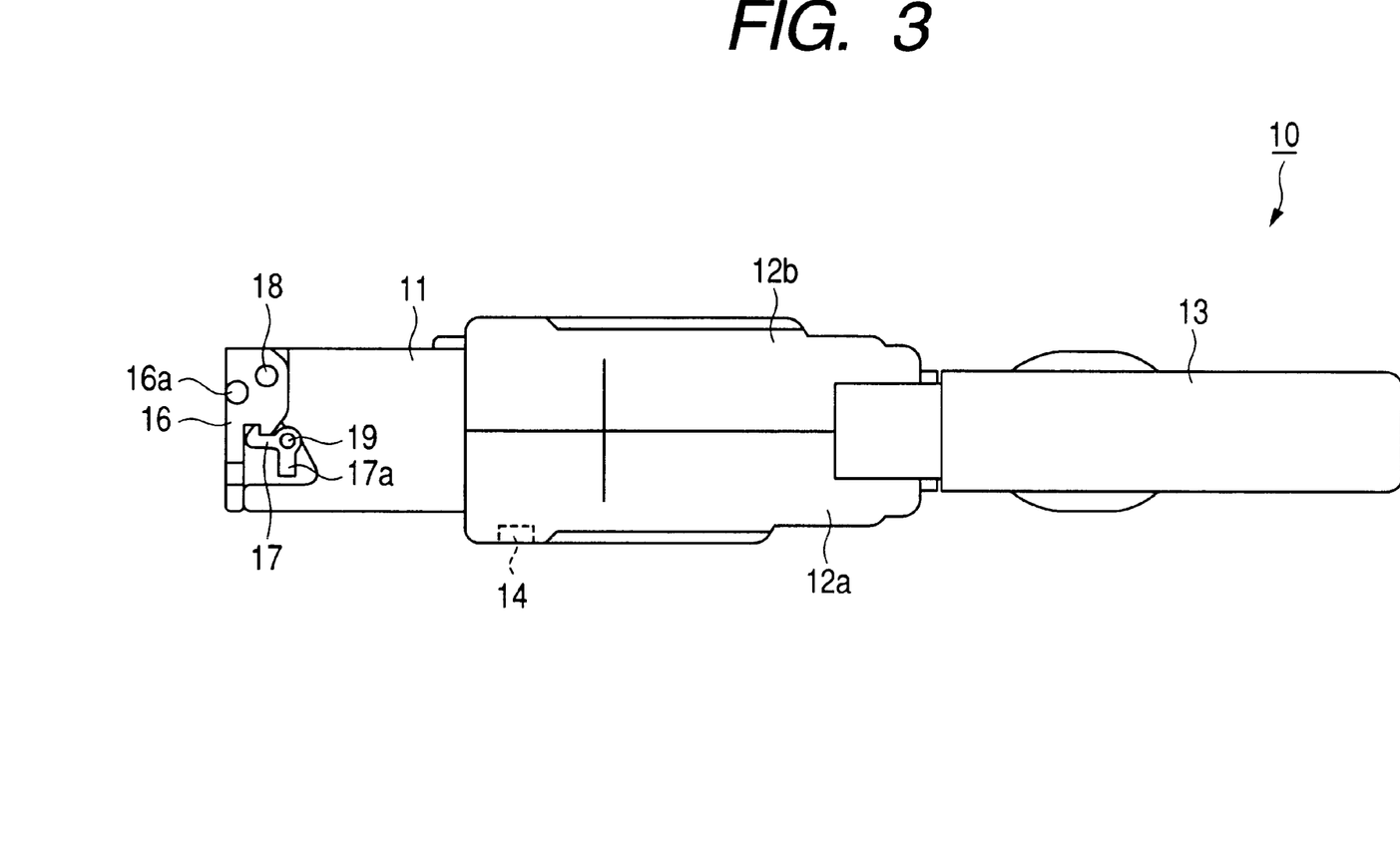
FIG. 3 is a plan view illustrating an embodiment of a feeding-side subconnector of a connector with a shutter mechanism according to the invention.
Figure 4:
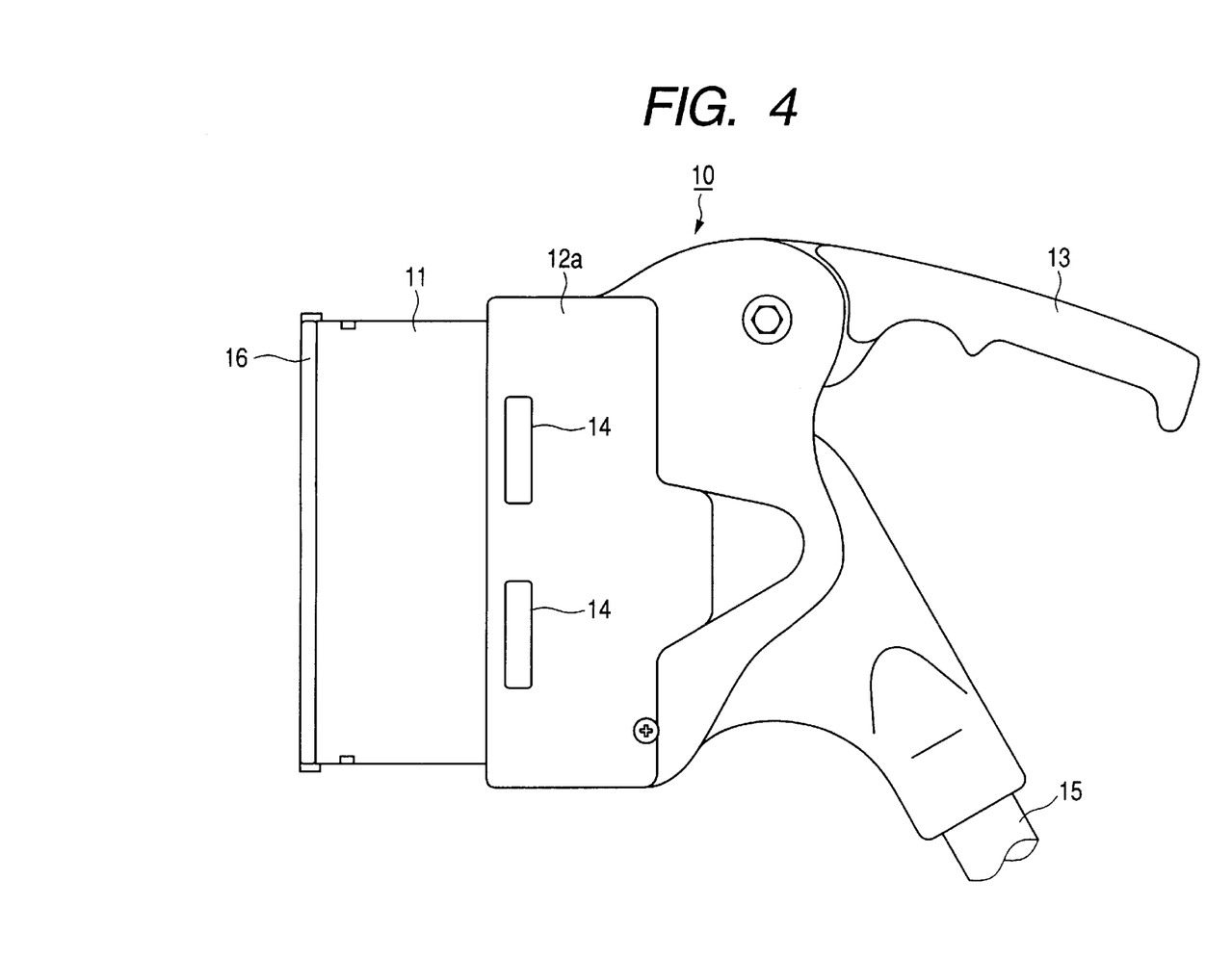
FIG. 4 is a side view illustrating the feeding-side subconnector of FIG. 3.
Figure 5:
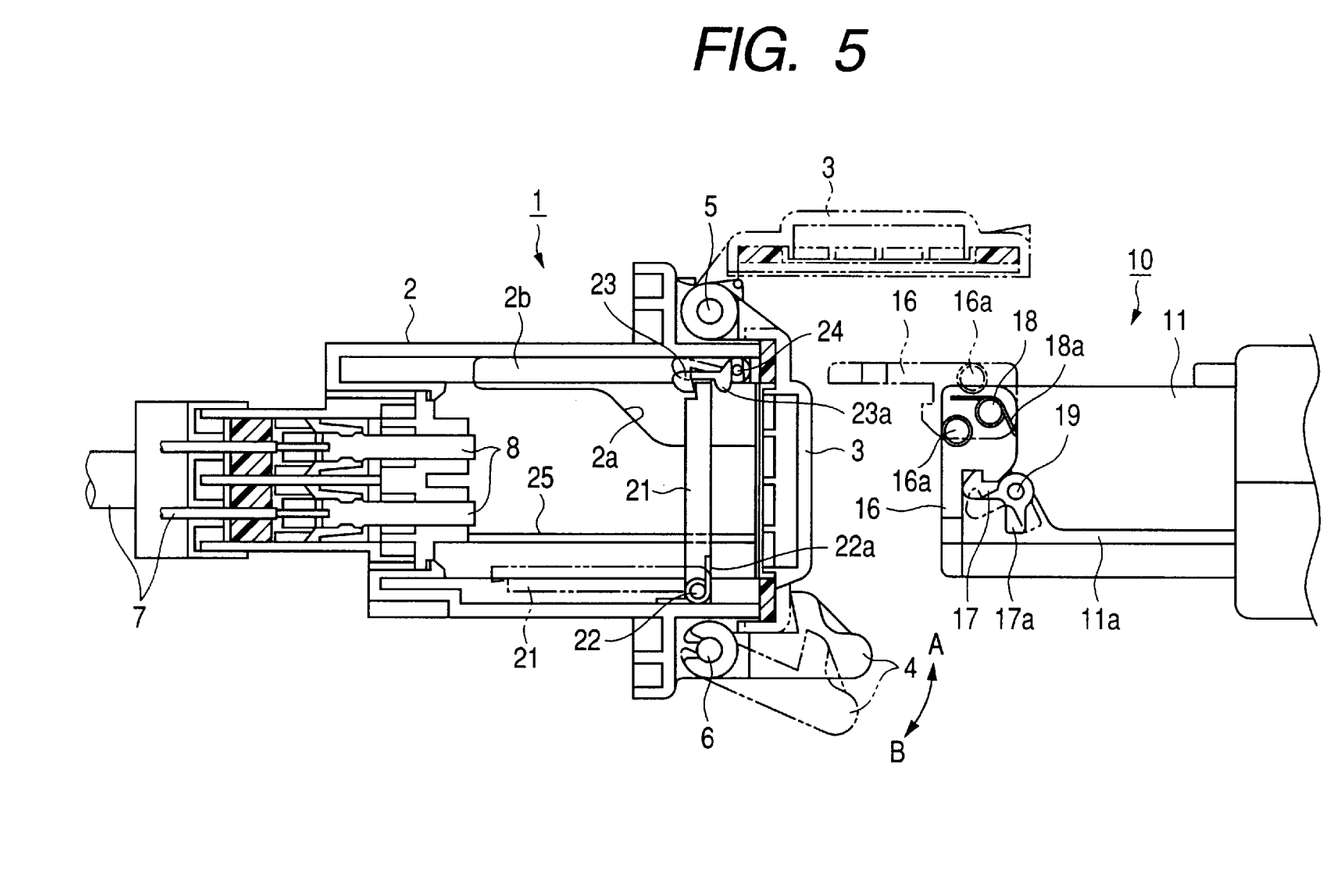
FIG. 5 is an operation explanatory view illustrating a state in which the feeding-side and receiving-side subconnectors are not fitted into each other.
Figure 6:
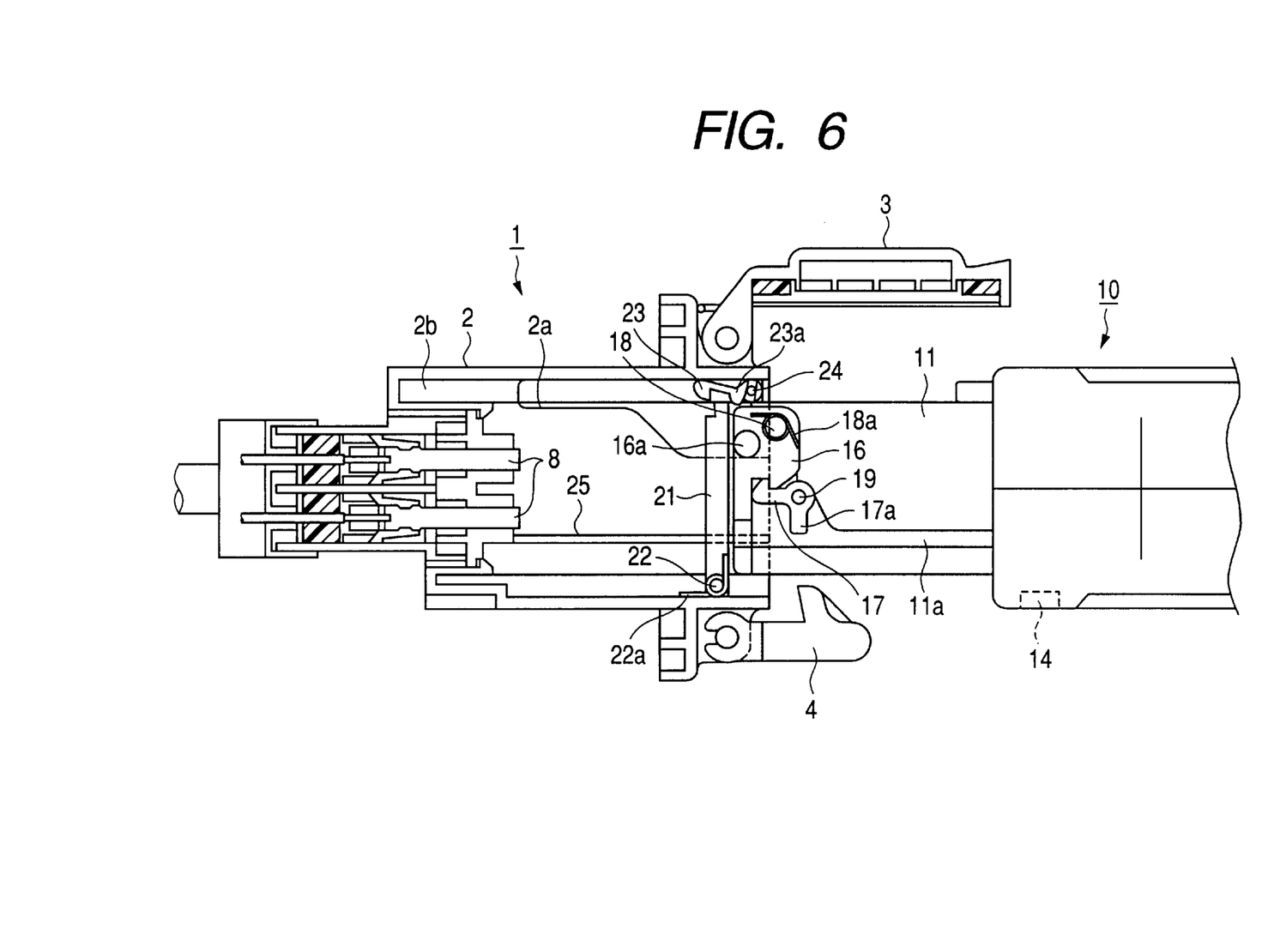
FIG. 6 is an operation explanatory view illustrating a state in which the fitting between the feeding-side and receiving-side subconnectors of FIG. 5 is started.

Hereinafter, an embodiment of a connector with a shutter mechanism according to the invention is described in detail with reference to FIGS. 1 to 11. FIG. 1 is a plan view illustrating an embodiment of a receiving-side subconnector of the connector according to the invention. FIG. 2 is a side view illustrating the receiving-side subconnector of FIG. 1. FIG. 3 is a plan view illustrating an embodiment of a feeding-side subconnector of the connector according to the invention. FIG. 4 is a side view illustrating the feeding-side subconnector of FIG. 3. FIG. 5 is an operation explanatory view illustrating a state in which the feeding-side and receiving-side subconnectors are not fitted into each other. FIG. 6 is an operation explanatory view illustrating a state in which the fitting between the feeding-side and receiving-side subconnectors of FIG. 5 is started.

Figure 7:
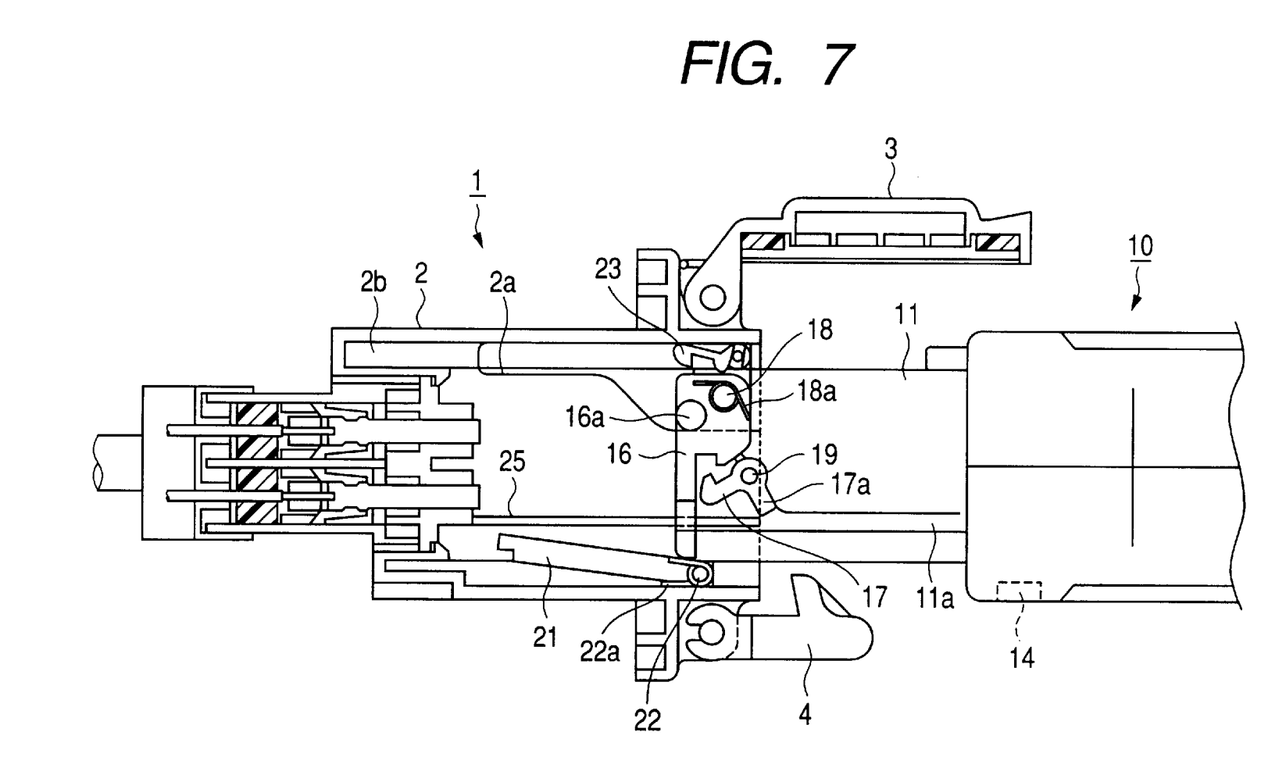
FIG. 7 is an operation explanatory view illustrating a state in which the fitting between the feeding-side and receiving side subconnectors of FIG. 5.
Figure 8:
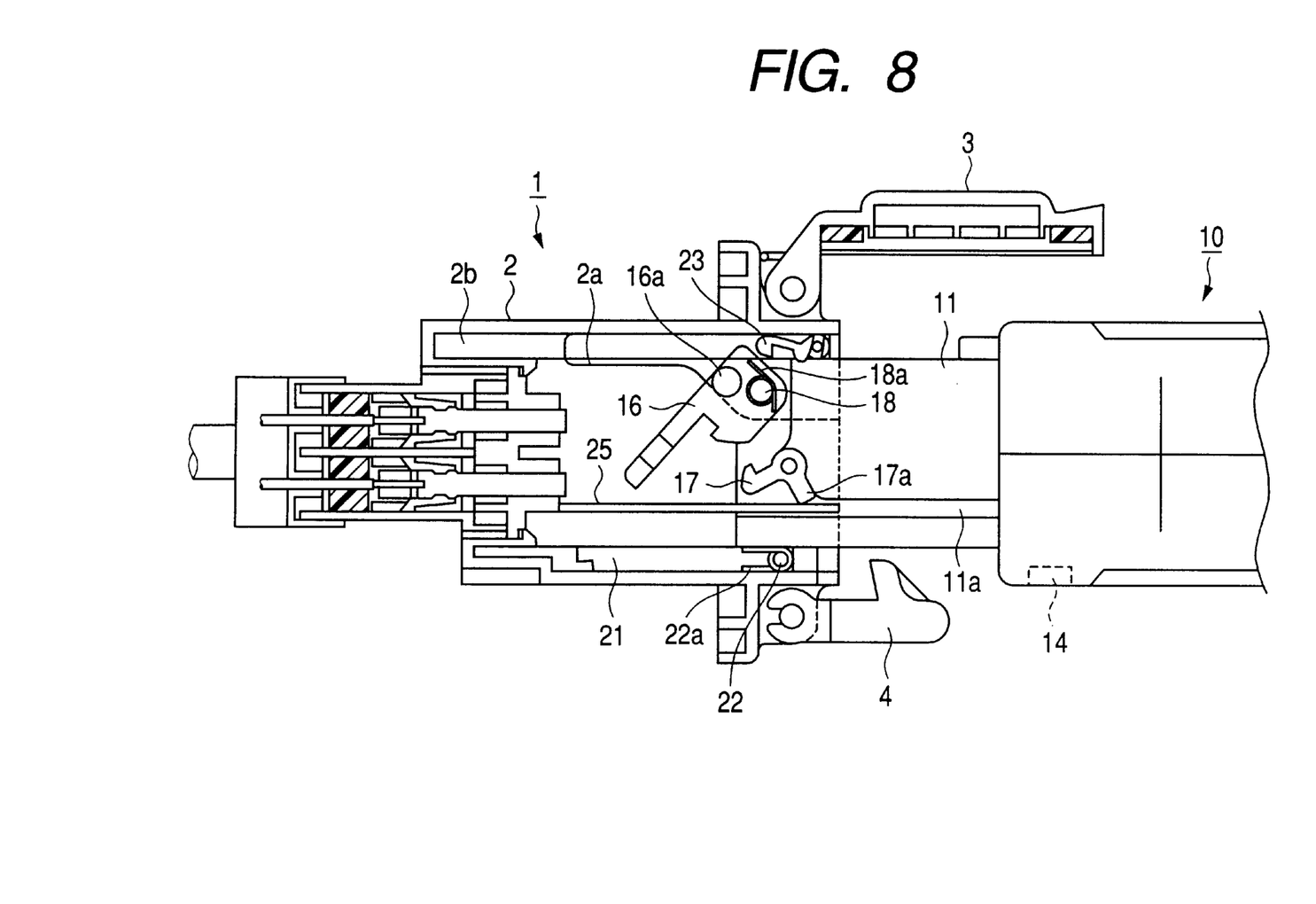
FIG. 8 is an operation explanatory view illustrating a midway state of the fitting between the feeding-side and receiving-side subconnectors of FIG. 5.
Figure 9:
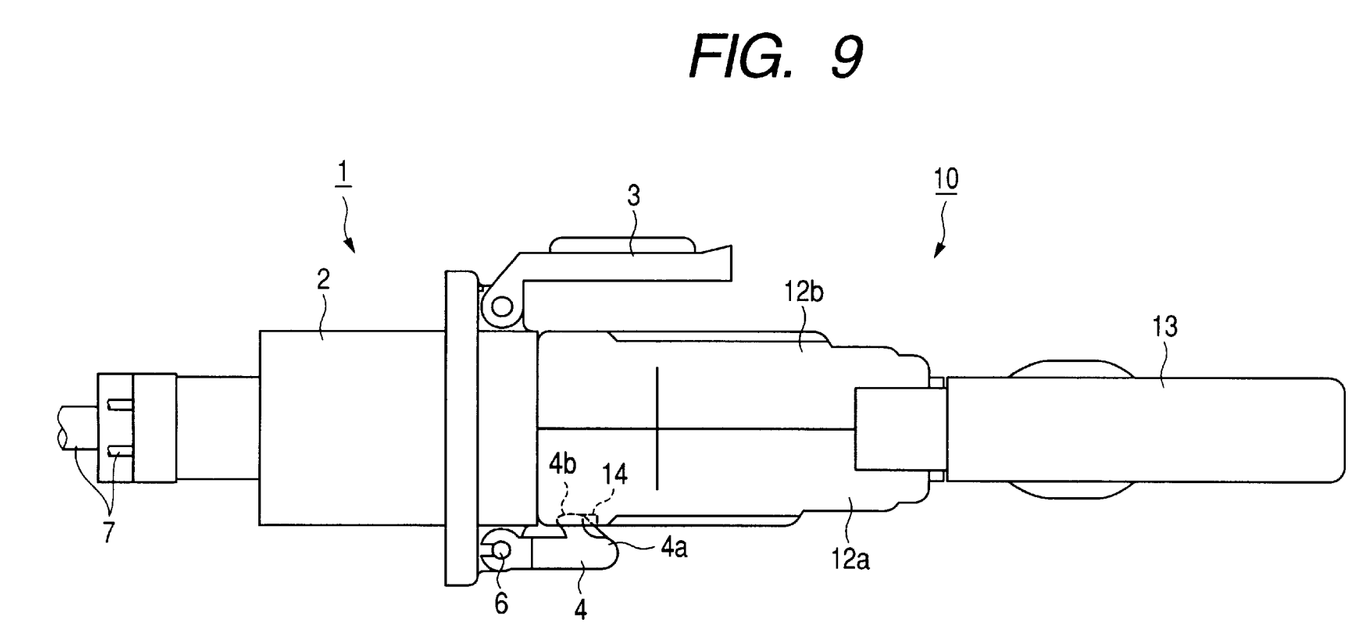
FIG. 9 is a plan view illustrating a completion state of the fitting between the feeding-side and receiving-side subconnectors of the connector with the shutter.
Figure 10:
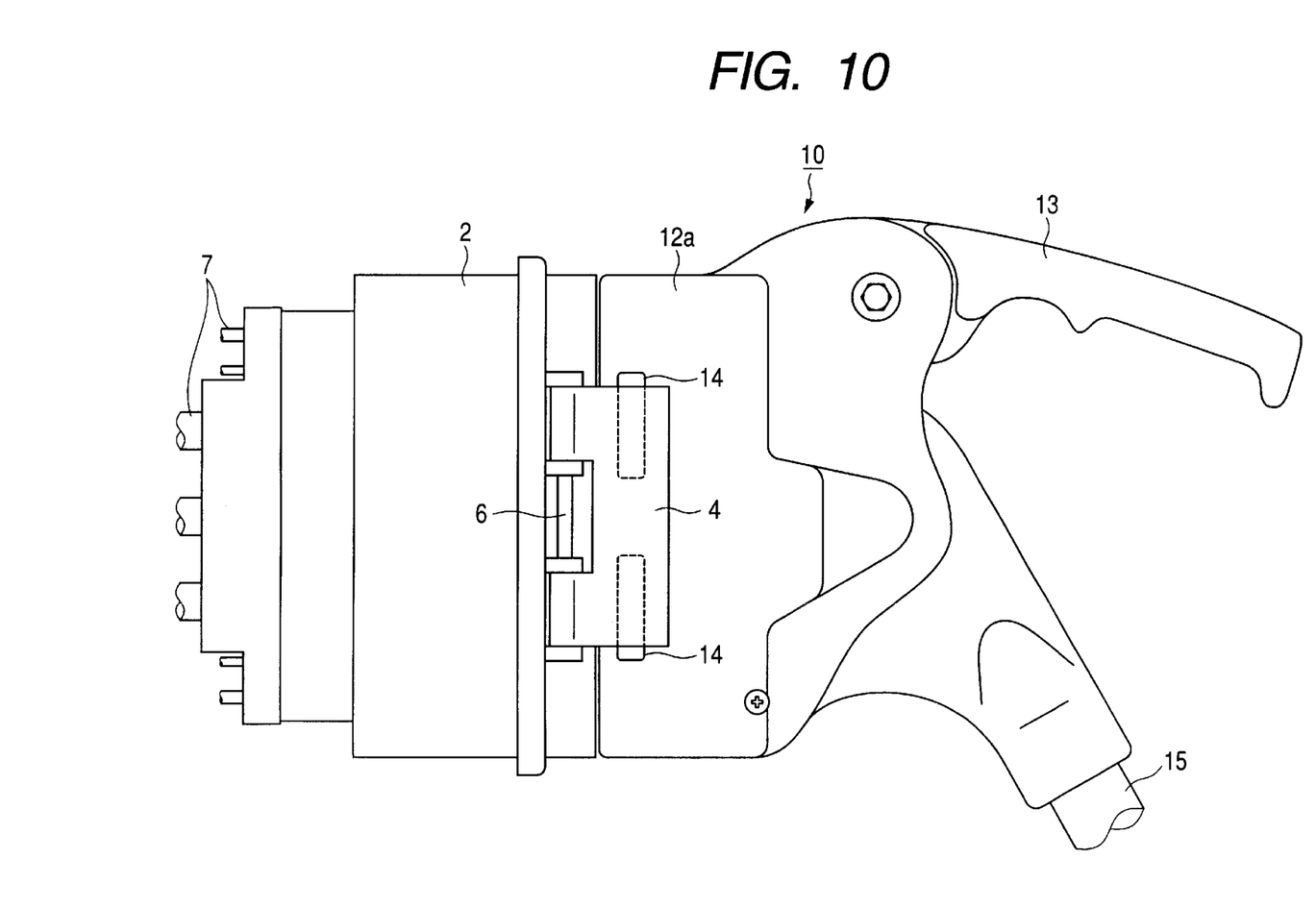
FIG. 10 is a side view illustrating the connector with the shutter shown in FIG. 9.
Figure 11:
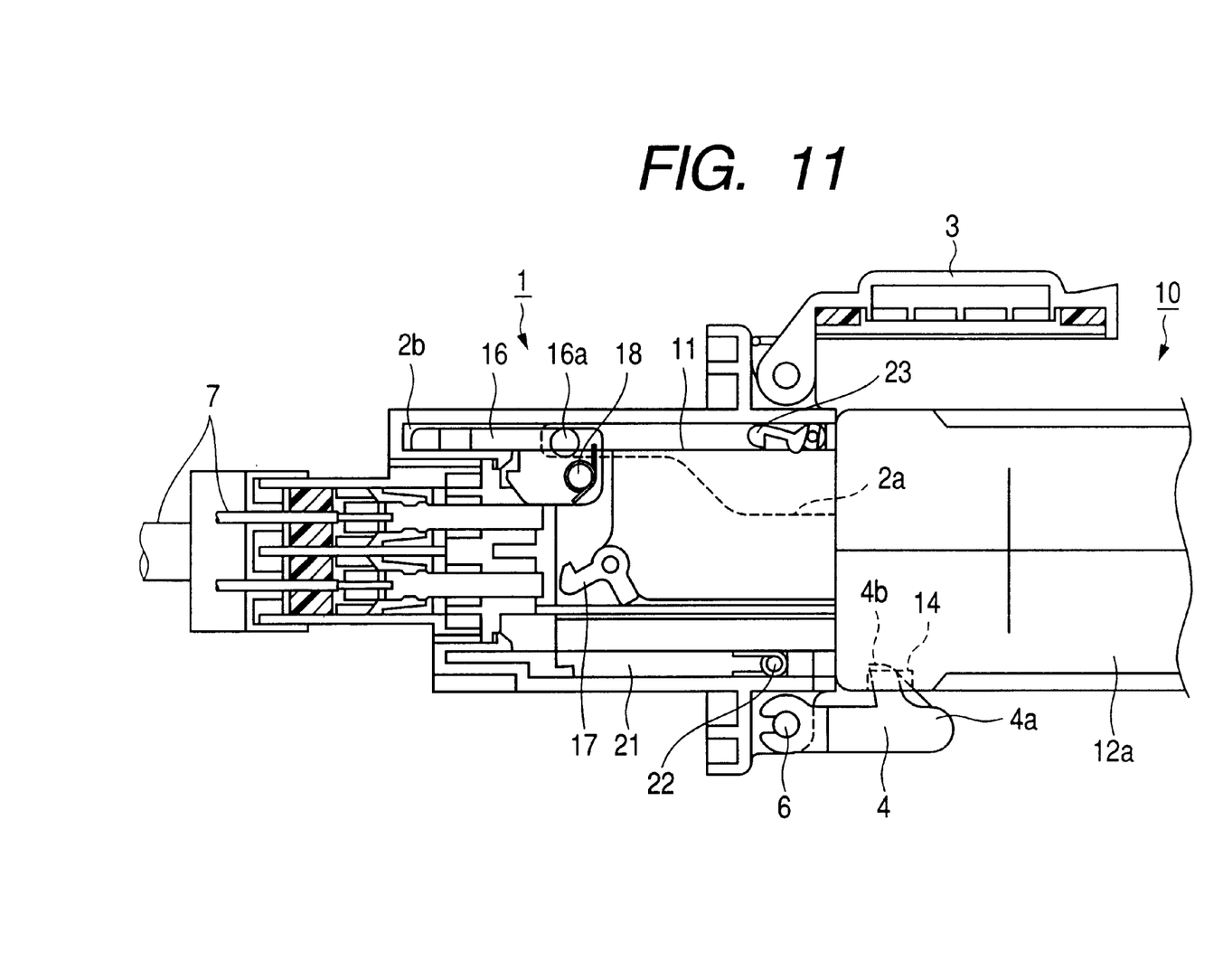
FIG. 11 is an operation explanatory view illustrating a completion state in which the fitting between the feeding-side and receiving-side connectors of the connector with the shutter shown in FIG. 5.

FIGS. 7 and 8 are operation explanatory views each illustrating a midway state of the fitting between the feeding-side and receiving-side subconnectors of FIG. 5. FIG. 9 is a plan view illustrating a completion state of the fitting between the feeding-side and receiving-side. FIG. 10 is a side view illustrating the connector shown in FIG. 9. FIG. 11 is an operation explanatory view illustrating a state in which the fitting between the feeding-side and receiving-side subconnectors of shown in FIG. 5 is completed. Incidentally, in the description of this embodiment, the description of an internal structure, such as the connecting terminal, of the feeding-side subconnector is omitted.

As illustrated in FIGS. 1 and 2, a receiving-side subconnector 1 serving as a first subconnector of the connector with a shutter according to this embodiment has a waterproof and dustproof cap 3, which is supported on a cap shaft 5 at a front end portion of a housing 2 accommodating a connecting terminal 8 (see FIG. 5) press-attached to an end portion of a wire 7 and which is urged by a cap spring (not shown) in an opening direction.

A cap lock 4 supported on the cap lock shaft 6 and urged by a cap lock spring (not shown) in the direction of the central axis of the housing 2 is provided on a side opposite to the cap 3 disposed on the front end portion of the housing 2. This cap lock 4 has a tapered surface 4a at a front end thereof and also has a hook-like end portion 4b.

As shown in FIG. 5, a rib 25 adapted to turn a feeding-side shutter lock 17 (to be described later) with fitting the feeding-side subconnector 10 into the receiving-side subconnector 1 is provided in an inner wall side portion of the housing 2.

A shutter guide groove 2b for guiding a free end portion of a feeding-side shutter 16 (to be described later), which is in an open state, is provided at the top end of the inner wall of the housing 2. Further, a curved cam groove 2a for guiding a boss 16a of the feeding-side shutter 16 (to be described later) is provided at the lower portion of the shutter guide groove 2b.

A receiving-side shutter 21 serves as a first waterproof and dustproof shutter is provided in a front portion of the housing 2. The receiving-side shutter 21 is supported on the first shutter shaft 22 and urged by the shutter spring 22a in an opening direction. Thus, the receiving-side subconnector 1 has a double closing structure constituted by the cap 3 provided at the front end portion and the receiving-side shutter 21.

The receiving-side shutter 21 has a first shutter lock 23. A free end portion of the first shutter lock 23 is supported on the shutter lock shaft 24 and urged by a shutter lock spring (not shown) in the direction of the first shutter shaft 22.

The first shutter lock 23 has a first projection 23a against which the front end of the feeding-side shutter, which is in a closed state, of the feeding-side subconnector 10 (to be described later).

As illustrated in FIGS. 3 and 4, in the feeding-side subconnector 10 serving as a second subconnector, the housing 11 accommodating a connecting terminal which is press-attached to an end portion of the wire 15, and the operation lever 13 to be operated at fitting as well as disengagement of the feeding-side subconnector 10 into the receiving-side subconnector 1 are sandwiched by outer cases 12a and 12b from both sides thereof and fastened with bolts and nuts.

Two lock accommodating portions 14 each for engaging an end portion 4b of the cap lock 4 are provided in side surface portions of one 12a of the outer cases. The feeding-side shutter 16 serving as a waterproof and dustproof second shutter supported on the second shutter shaft 18 and urged by the shutter spring 18a (see FIG. 5) in an opening direction is provided at the front end portion of the housing 11. The boss 16a sliding on the cam groove 2a at the side of the receiving-side subconnector 1 is provided on the side surface of this feeding-side shutter 16.

The second shutter lock 17 is provided adjacent to the feeding-side shutter 16. The second shutter lock 17 is supported on the shutter lock shaft 19 and urged by the shutter spring (not shown) in the direction of the second shutter shaft 18. A second projection 17a is provided at this second shutter lock 17 so as to abut against an end portion of the rib 25 in accordance with the fitting of the feeding-side and receiving-side connectors 1, 10.

A rib receiving groove 11a for guiding the rib 25 of the receiving-side subconnector 1 is formed in the outer wall portion of the housing 11.

Next, a fitting operation of the connector according to this embodiment is described hereinbelow.

First, when the cap lock 4 of the receiving-side subconnector 1 is displaced in the direction of an arrow B by fingers, as illustrated in FIG. 5, the lock state of the cap 3 is released. Thus, the cap 3 is opened in the direction of an arrow A. That is, the cap 3 is automatically turned around the cap shaft 5 by the action of a cap spring (not shown) by releasing the cap lock 4. Thus, the front end portion of the housing 2 is put into an open state. Then, the cap lock 4 is returned in the direction of the arrow A by the action of a cap lock spring (not shown) by taking the finger off the cap lock 4.

Subsequently, when the feeding-side subconnector 10 is inserted into the housing 2 of the receiving-side subconnector 1 as illustrated in FIG. 6, the end portion of the housing 11 abuts against the first projection 23a of the first shutter lock 23 of the receiving-side subconnector 1 and causes the first shutter lock 23 to outwardly turn around the shutter lock shaft 24. The lock state of the receiving-side shutter 21 is released by this turn of the first shutter lock 23.

Consequently, as illustrated in FIG. 7, the receiving-side shutter 21 of the receiving-side subconnector 1 is urged by the end portion of the feeding-side subconnector 10, so that the receiving-side shutter 21 turns around the first shutter shaft 22 against the urging force of the shutter spring 22a.

Then, the feeding-side subconnector 10 is further inserted thereinto. Thus, the rib 25 formed on the inner wall of the housing 2 of the receiving-side subconnector 1 enters the rib receiving groove 11a of the housing 11 of the feeding-side subconnector 10 and simultaneously abuts against the second projection 17a of the second shutter lock 17 to thereby cause the second shutter lock 17 to turn. This turn of the second shutter lock 17 releases the lock state of the feeding-side shutter 16.

Consequently, as illustrated in FIG. 8, the boss 16a of the feeding-side shutter 16 of the feeding-side subconnector 10 abuts against the cam groove 2a formed in the inner wall portion of the housing 2 of the receiving-side subconnector 1. As the feeding-side subconnector 10 is inserted into the housing 2, the boss 16a of the feeding-side shutter 16 moves around the second shutter shaft 18 along the cam groove 2a.

Then, the feeding-side shutter 16, which is urged by the shutter spring 18a in a closing direction, opens with this movement of the boss 16a. Thus, a connecting terminal (not shown) in the housing 11 of the feeding-side subconnector 10 is brought into a connectable state.

Subsequently, as illustrated in FIGS. 9 to 11, the feeding-side subconnector 10 is further inserted into the receiving-side subconnector 1. Then, the front surface portion of one 12a of the outer cases abuts against the tapered surface 4a of the cap lock 4. Further, the feeding-side subconnector 10 is inserted thereinto still more. Then, the cap lock 4 turns in the direction of the arrow B (see FIG. 5) along the tapered surface 4a. Finally, the end portion 4b of the cap lock 4 is fitted into the lock accommodating portion 14 of the outer case 12a. Thus, the fitting between the subconnectors 1 and 10 is completed.

Next, when the feeding-side subconnector 10 is disengaged from the receiving-side subconnector 1, the subconnector 10 can easily be disengaged therefrom by releasing the cap lock 4 with a finger and then drawing out the feeding-side subconnector 10 therefrom in a state in which the cap lock 4 is released, similarly as when the cap 3 is opened.

At that time, each of the opened feeding-side shutter 16 and the opened receiving-side shutter 21 is automatically turned in a closing direction by an urging force of the corresponding shutter spring. Both the receiving-side shutter 21 and the feeding-side shutter 16 are locked by the first shutter lock 23 and the second shutter lock 17, respectively.

The present invention is not limited to the above embodiment, but suitable modifications and improvements can be made.

For example, the connector structure of the receiving-side subconnector 1 in the above embodiment can be applied to a feeding-side subconnector, similarly, the structure of the feeding-side subconnector 10 can be applied to a receiving-side subconnector.

As described above, in the connector of the invention, a shutter lock for preventing, when both the subconnectors are not fitted into each other, each of the shutters from turning is turnably supported on a shaft in the vicinity of the shutter and urged by a spring in a direction. Further, when both the subconnectors are fitted into each other, the shutter lock turns against an urging force of the spring to thereby release the lock of the shutter.

Thus, when both the subconnectors are not fitted into each other, each of the shutters is reliably locked by the shutter lock, which is urged by a spring in one direction. Consequently, it does not occur that the shutters are easily released. Conversely, at the fitting of the subconnectors, the shutter lock turns against the urging force of a spring, as both the subconnectors are fitted into each other. Thus, the lock state of the shutter is released, so that the shutter is opened. Then, the connecting terminals of both the subconnectors are connected to each other by accommodating the opened shutter in the housing. Thus, when both the subconnectors are not fitted into each other, opening portions of the connecting terminals are completely closed by the shutters. Consequently, an operator can be reliably prevented from getting an electric shock. Thus, a highly safe and reliable connector with a shutter mechanism can be obtained.

In the connector of the invention, a cap lock for preventing, when both the subconnectors are not fitted into each other, the cap from turning is provided on a connector housing. Moreover, the cap lock is also used as a fitting lock for locking a fitting state, in which the first subconnector is fitted to the second subconnector, upon completion of fitting both the first and second subconnectors into each other. Furthermore, in the third connector of the invention, the cap lock is turnably supported on a shaft and urged by a spring in a direction of the inside of the connector housing, and that a lock accommodating portion for engaging an end portion of the cap lock with a side portion of the second subconnector.

Therefore, upon completion of fitting between both the subconnectors, the end portion of the cap lock engages with the lock accommodating portion of the counterpart second subconnector. Thus, the cap lock functions as a fitting lock for locking a state in which both the subconnectors are completely fitted into each other. Therefore, there is no necessity for providing the dedicated fitting lock at the side of the first subconnector. The structure can be simplified by reducing the number of components. The miniaturization of both the subconnectors can be achieved.

Further, an operation of disengaging the feeding-side subconnector and an operation of opening a cap are performed by releasing the cap lock. Thus, no complex operation is necessary. Consequently, the frequency of occurrence of connector breakage due to a misoperation can be reduced. Thus, a highly reliable connector, which excels in operability, with a shutter mechanism can be obtained.

In the connector of the invention, a first shutter at the side of the first subconnector is turnably supported on a first shutter shaft and urged by a spring in a closing direction. Moreover, when both the subconnectors are fitted into each other, the first shutter is turned by a front end of the second subconnector in an opening direction. Furthermore, in the fifth connector of the invention, a first shutter lock at the side of the first subconnector is turnably supported on a shaft and urged by a spring in a direction. Further, the first shutter lock has a first lock-releasing projection, against which an end portion of the second subconnector abuts when both the subconnectors are fitted into each other.

Therefore, when both the subconnectors are not fitted into each other, the first shutter is urged by a spring in a closing direction. Moreover, the first shutter is locked and urged by the first shutter lock, which is urged by the spring, in a closing direction, so that the first shutter is not opened by an external force.

Conversely, when both the subconnectors are fitted into each other, the end portion of the counterpart second subconnector abuts against the first projection. Thus, the first shutter lock turns and releases the lock state of the first shutter. Moreover, the end portion of the second subconnector causes the first shutter to turn in an opening direction. Therefore, as both the subconnectors are fitted into each other, the lock state of the first shutter can easily be released.

In the connector of the invention, a second shutter at the side of the second subconnector is turnably supported on a second shutter shaft and urged by a spring in a closing direction. Moreover, a boss portion for turning the second shutter in an opening direction is provided at a side portion of the second shutter. Furthermore, in the seventh connector of the invention, a shutter guide groove for guiding a free end portion of the second shutter, which is in an open state, at the side of the second subconnector is provided in the connector housing of the first subconnector. Further, a curved cam groove for guiding, when both the subconnectors are fitted into each other, the boss portion is provided in range with the shutter guide groove.

Therefore, when the subconnectors are fitted into each other, the boss portion of the second shutter slides on the cam groove, so that the second shutter is opened in the fitting direction against the urging force of the spring, and that both side ends of the free end portion thereof are fitted and inserted into the shutter guide groove. Consequently, as both the subconnectors are fitted into each other, the second shutter can reliably be opened and accommodated in the connector housing of the counterpart first subconnector.

In the connector of the invention, a rib for turning, when both the subconnectors are fitted into each other, a second shutter lock is provided in the connector housing at the side of the first subconnector. Further, the second shutter lock at the side of the second subconnector is turnably supported on a shaft and urged by a spring in a direction and has a second lock-releasing projection, against which an end portion of the rib abuts. Moreover, a rib receiving groove for guiding the rib is provided in the connector housing at the side of the second subconnector.

Therefore, when both the subconnectors are not fitted into each other, the second shutter is urged by a spring in a closing direction. Moreover, the second shutter is locked and urged by the second shutter lock, which is urged by the spring, in a closing direction, so that the second shutter is not opened by an external force. Conversely, at the time of performing the fitting of the subconnectors, the end portion of the rib guided by the rib receiving groove abuts against the second projection of the second shutter lock, as the both the subconnectors are fitted into each other. Thus, the second shutter lock is turned, so that the lock state of the second shutter can be released. Consequently, as both the subconnectors are fitted into each other, the lock state of the second shutter can more reliably be released.

What is claimed is:

1. A connector including a first subconnector having an openable and closable cap provided at a front end portion of said first subconnector and a second subconnector to be fitted to said first connector, each of said first and second subconnectors having a shutter mechanism comprising:

a shutter closing a chamber when said first subconnector and said second subconnector are not fitted into each other, and said shutter being adapted to turn in an opening direction when said first subconnector and said second subconnector are fitted into each other; and a shutter lock turnably supported on a shaft in a vicinity of said shutter and urged by a spring;

wherein said shutter lock prevents a turning of said shutter when said first subconnector and said second subconnector are not fitted into each other and said shutter lock turns against an urging force of said spring to thereby release lock of said shutter when said first subconnector and said second subconnector are fitted into each other.

2. The connector according to claim 1, further comprising a rib provided in said connector housing of said first subconnector for turning a second shutter lock when said first and second subconnectors are fitted into each other; and a rib receiving groove for guiding said rib provided in a connector housing of said second subconnector;

wherein said second shutter lock is turnably supported on a shaft and urged by a spring and has a second lock-releasing projection, against which an end portion of said rib abuts.

3. The connector according to claim 1, further comprising a cap lock provided on a connector housing of said first subconnector for preventing a turning of said cap when said first subconnector is not fitted into said second subconnector, said cap lock serving as a fitting lock for locking said second subconnector when said first subconnector is fitted to said second subconnector.

4. The connector according to claim 3, wherein said cap lock is turnably supported on a shaft and urged by a spring in a direction of inside of said connector housing, and wherein a lock accommodating portion for engaging an end portion of said cap lock with a side portion of said second subconnector.

5. The connector according to claim 1, wherein a first shutter provided in said first subconnector is turnably supported on a first shutter shaft and urged by a spring in a closing direction, and wherein when said first and second subconnectors are fitted into each other, said first shutter is turned by a front end of said second subconnector in an opening direction.

6. The connector according to claim 5, wherein a first shutter lock provided in said first subconnector is turnably supported on a shaft and urged by a spring, and wherein said first shutter lock has a first lock-releasing projection, against which an end portion of said second subconnector abuts when said first and second subconnectors are fitted into each other.

7. The connector according to claim 5, wherein a second shutter provided in said second subconnector is turnably supported on a second shutter shaft and urged by a spring in a closing direction, and wherein a boss portion for turning said second shutter in an opening direction is provided at a side portion of said second shutter.

8. The connector according to claim 7, further comprising a shutter guide groove provided in said connector housing of said first subconnector for guiding a free end portion of said second shutter, which is in an open state, in said second subconnector; and a curved cam groove provided in range with said shutter guide groove for guiding said boss portion when said first and second subconnectors are fitted into each other.

9. A subconnector adapted to be fitted to a mating subconnector comprising:

a shutter closing a chamber when said subconnector is not fitted into said mating subconnector, and said shutter being adapted to turn in an opening direction when said subconnector is fitted into said mating subconnector;

an openable and closable cap provided at a front end portion of said subconnector for closing said front end portion; and a shutter lock turnably supported on a shaft in a vicinity of said shutter and urged by a spring;

wherein said shutter lock prevents a turning of said shutter when said subconnector is not fitted into said mating subconnector and said shutter lock turns against an urging force of said spring to thereby release lock of said shutter when said subconnector is fitted into said mating subconnector.

10. The subconnector according to claim 9, further comprising a rib provided in said connector housing of said subconnector for turning a second shutter lock provided in said mating subconnector when said subconnector is fitted into said mating subconnector.

11. The subconnector according to claim 9, further comprising a cap lock provided on a connector housing of said subconnector for preventing a turning of said cap when said subconnector is not fitted into said mating subconnector, said cap lock serving as a fitting lock for locking said mating subconnector when said subconnector is fitted to said mating subconnector.

12. The subconnector according to claim 11, wherein said cap lock is turnably supported on a shaft and urged by a spring in a direction of inside of said connector housing, so that an end portion of said cap lock engages with a side portion of said mating subconnector.

13. The subconnector according to claim 9, wherein a first shutter provided in said subconnector is turnably supported on a first shutter shaft and urged by a spring in a closing direction, and wherein said first shutter is turned by a front end of said mating subconnector in an opening direction when said subconnector is fitted into said mating subconnector.

14. The subconnector according to claim 13, wherein a first shutter lock provided in said subconnector is turnably supported on a shaft and urged by a spring and wherein said first shutter lock has a first lock-releasing projection, against which an end portion of said mating subconnector abuts when said subconnector is fitted into said mating subconnector.

15. The subconnector according to claim 13, further comprising a shutter guide groove formed in said connector housing of said subconnector for guiding a free end portion of a second shutter provided in said mating subconnector in an open state of said second shutter; and a curved cam groove provided in range with said shutter guide groove for guiding a boss portion of said second shutter when said subconnector is fitted into said mating subconnector.

16. A subconnector adapted to be fitted to a mating subconnector comprising:

a shutter closing a chamber when said subconnector is not fitted into said mating subconnector, and said shutter being adapted to turn in an opening direction when said subconnector is fitted into said mating subconnector, a shutter lock turnably supported on a shaft in a vicinity of said shutter and urged by a spring, wherein said shutter lock prevents a turning of said shutter when said subconnector is not fitted into said mating subconnector and said shutter lock turns against an urging force of said spring to thereby release lock of said shutter when said subconnector is fitted into said mating subconnector.

17. The subconnector according to claim 16, further comprising a boss portion provided at a side portion of said shutter for turning said shutter in an opening direction.

18. The subconnector according to claim 16, further comprising a rib receiving groove formed in said subconnector for guiding a rib which is provided in said mating subconnector;

wherein said shutter lock is turnably supported on a shaft and urged by a spring, and said shutter lock has a lock-releasing projection, against which an end portion of said rib abuts.

* * * * *